United States Patent [19]
Arnold et al.

[11] Patent Number: 5,687,952
[45] Date of Patent: Nov. 18, 1997

[54] WATER FAUCET POPPET VALVE

[75] Inventors: Don C. Arnold, Buffalo Grove, Ill.; Mario Semchuck, Chatsworth, Calif.

[73] Assignee: Wave Corporation, Lincolnshire, Ill.

[21] Appl. No.: 540,644

[22] Filed: Oct. 11, 1995

[51] Int. Cl.[6] .................................................. F16K 31/00
[52] U.S. Cl. .................... 251/335.3; 251/230; 4/678; 239/583; 137/801
[58] Field of Search .................. 4/678; 239/583; 137/801; 251/335.3, 230

[56] References Cited

U.S. PATENT DOCUMENTS

| | | |
|---|---|---|
| 2,672,018 | 3/1954 | Jacobs . |
| 2,743,738 | 5/1956 | Johnson ............................. 251/335.3 |
| 3,220,695 | 11/1965 | Downey et al. ........................ 251/230 |
| 3,498,546 | 3/1970 | Logan et al. ........................ 239/583 |
| 3,528,087 | 9/1970 | Perkins ............................. 251/335.3 |
| 4,079,894 | 3/1978 | Harjar et al. ....................... 239/583 |
| 4,344,457 | 8/1982 | Caroli ............................. 251/230 |
| 4,346,735 | 8/1982 | Raz ................................ 137/801 |
| 4,421,295 | 12/1983 | Parkison .......................... 251/335.3 |
| 4,624,662 | 11/1986 | Le ................................ 251/117 |
| 4,874,014 | 10/1989 | Grant et al. ......................... 137/884 |
| 4,911,411 | 3/1990 | Jones et al. ........................ 251/335.3 |
| 4,997,008 | 3/1991 | Zbia .............................. 137/801 |
| 5,000,215 | 3/1991 | Phillips ............................ 137/15 |
| 5,065,982 | 11/1991 | Shih ............................. 251/320 |

FOREIGN PATENT DOCUMENTS

| | | | |
|---|---|---|---|
| 1909444 | 9/1969 | Germany ......................... 137/801 |
| 564094 | 2/1956 | Italy ........................... 251/335.3 |
| 1142363 | 2/1969 | United Kingdom ................ 251/335.3 |

*Primary Examiner*—A. Michael Chambers
*Attorney, Agent, or Firm*—Warner Norcross & Judd

[57] ABSTRACT

A poppet valve assembly wherein the valve stem is protected from water contact. The valve includes a housing, a valve stem reciprocable within the housing, and a valve seal over the stem. The seal is a boot or sleeve having a base end and a valve end. The base end is open and sealed about its entire periphery to the housing. The valve end seals against the end of the valve stem. The housing defines a valve seat, and the valve end of the seal includes a valve portion selectively engaging the seat. Preferably, the seal further includes a bellows portion along its length to bias the valve portion into engagement with the valve seat.

9 Claims, 2 Drawing Sheets

WATER FAUCET POPPET VALVE

BACKGROUND OF THE INVENTION

The present invention relates to poppet valves, and more particularly to poppet valves for water faucets.

Poppet valves are well known and have been extensively developed for the control of liquid flow, for example, in water faucets. A poppet valve closes with the assistance of fluid pressure. The typical valve includes a valve seat, a stem, and an elastomeric seal on the end of the stem. The valve is opened by moving the stem in a direction opposite to that of the water flow to permit fluid to flow between the seal and the seat. When the stem is released, the fluid flow and pressure assist in returning and retaining the seal against the seat.

A typical prior art poppet valve construction is illustrated in FIG. 5 and generally designated 110. The valve includes a housing 112, a valve stem 114, and a primary seal 116. The housing includes a valve seat 118 selectively engaged by the primary seal. A coil spring 120 is mounted about the stem to urge the primary seal into engagement with the valve seat. A secondary seal 122, typically an O-ring, seals the stem within the housing. The stem 114 is typically lubricated to prevent wear, to assure smooth action, and to retain the integrity of the seal.

Unfortunately, the secondary seal is a frequent location for product failure because of the exposure of this seal to water and water flow. Lubrication of the stem/seal relationship is essential to ensure the integrity of the seal. However, lubrication is constantly flushed away from this area by flowing water and eventually washed out. Additionally, exposure of the typically metal stem to water often results in corrosion or liming, further contributing to eventual sticking and wear, which can result in leaking at the primary and/or secondary seals.

Consequently, prior art poppet valves are subject to leaking, relatively short lives, and continual servicing; and such valves have not been widely used in water faucets.

SUMMARY OF THE INVENTION

The aforementioned problems are overcome in the present invention wherein a one-piece valve seal both provides the primary and secondary seals within a poppet valve and prevents water from coming into contact with the valve stem within the seal.

More particularly, the poppet valve includes a housing, a stem, and the valve seal. The housing defines a valve seat. The seal is a sleeve or boot fitted over the valve stem. The sleeve includes an open base end and a tip end. The open end is sealed to the housing to provide the secondary valve seal. The tip end fits over the valve stem to provide the primary seal.

The one-piece seal efficiently and effectively provides both the primary and secondary seals within the valve. Consequently, the valve stem within the seal is isolated from fluid contact and is thus permanently lubricated and protected against corrosion and liming.

In a preferred embodiment of the invention, the valve seal includes an integral bellows portion biasing the primary seal on the tip end into engagement with the valve seat. The bellows acts as the return spring and eliminates the need for a separate conventional return spring.

These and other objects, advantages, and features of the invention will be more fully understood and appreciated by reference to the detailed description of the preferred embodiment and the drawings.

DETAILED DESCRIPTION OF THE PREFERRED EMBODIMENT

Figure 1:
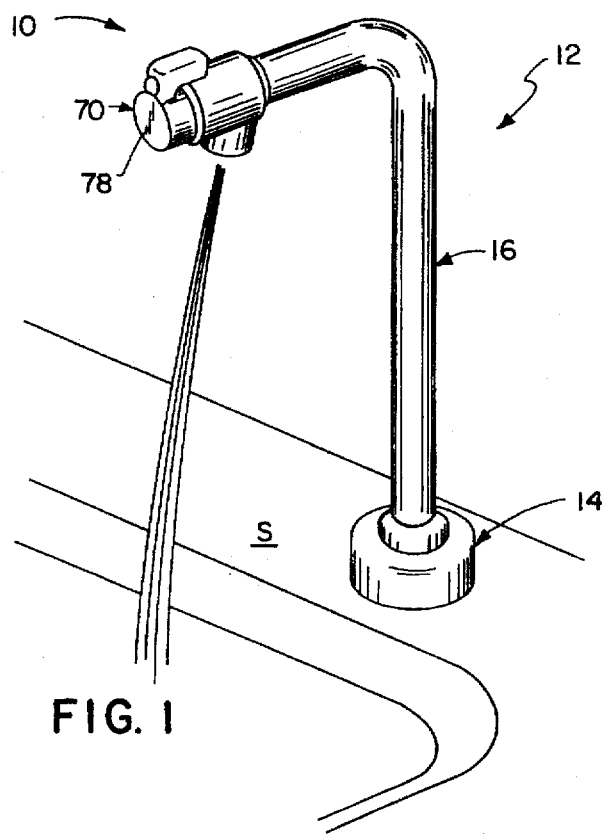
FIG. 1 is a perspective view of a water faucet incorporating the poppet valve of the present invention.
Figure 2:
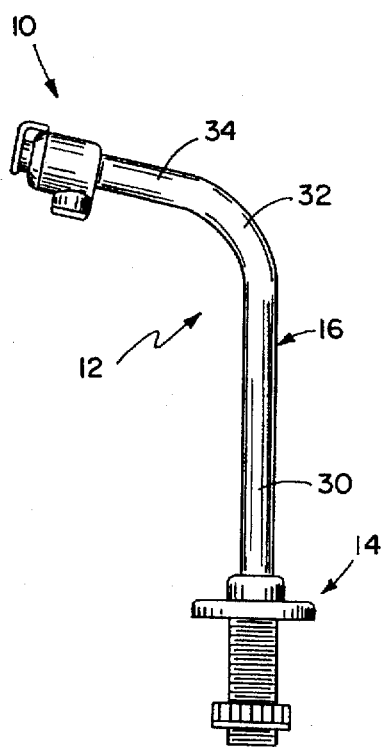
FIG. 2 is a side elevational view of the faucet.
Figures 4, 5:
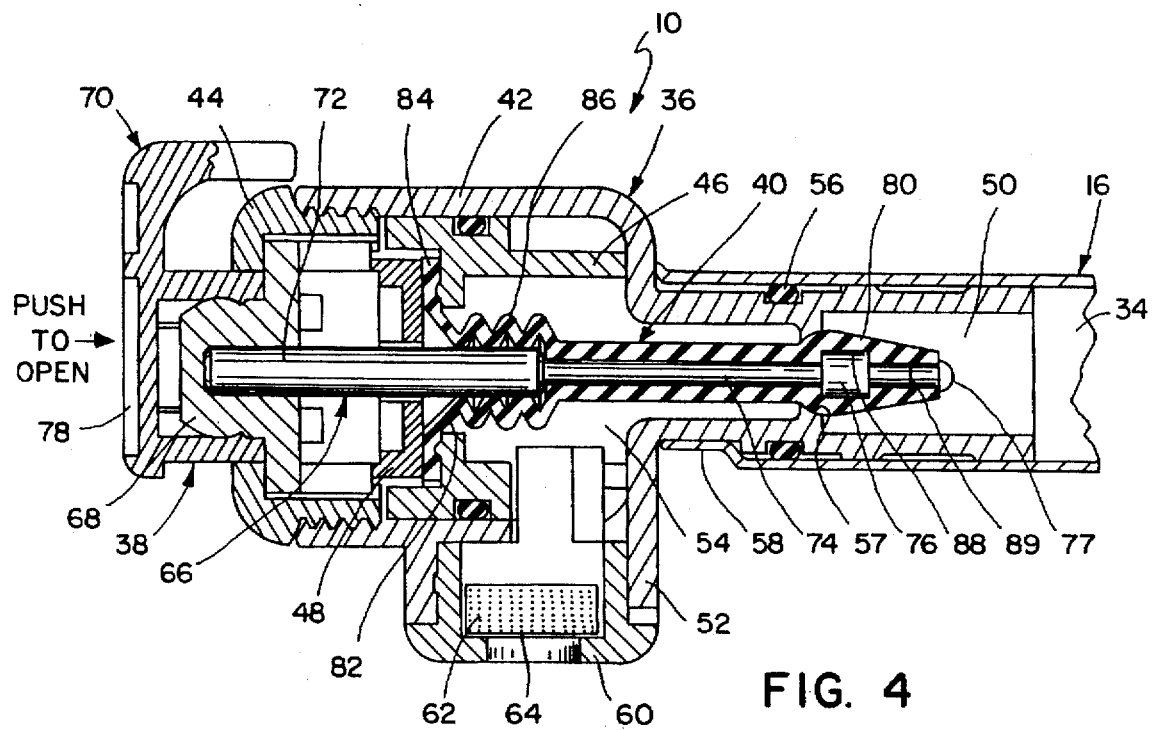
FIG. 4 is an enlarged sectional view of the poppet valve of the present invention.
FIG. 5 is a schematic sectional view of a prior art poppet valve.

A poppet valve assembly constructed in accordance with a preferred aspect of the invention is illustrated in FIGS. 1–2 and 4 and generally designated 10. As illustrated in FIG. 1, the poppet valve assembly 10 is used in conjunction with a water faucet 12 of the type generally known as a ledge faucet otherwise of generally conventional design. The ledge faucet 12 includes a base assembly 14 for mounting the faucet within a sink or counter top S, a spout 16, and the poppet valve assembly 10. Ledge faucets are widely used in conjunction with under counter water purification systems and under counter water heaters. While the present poppet valve assembly 10 is described in conjunction with a ledge faucet 12, the valve has widespread applicability in water faucet and other fluid control fields.

Figure 3:
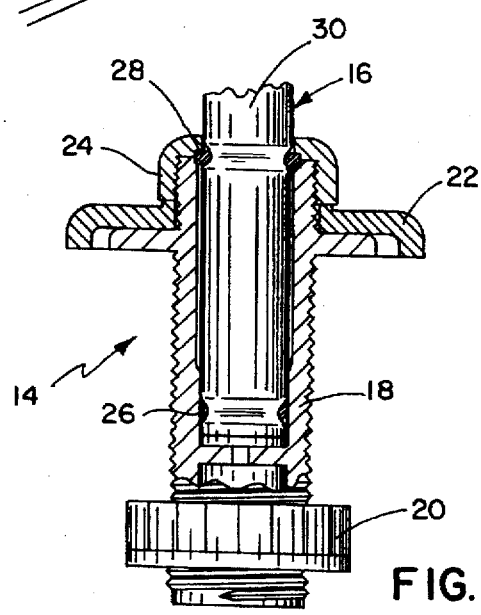
FIG. 3 is an enlarged sectional view of the base assembly of the faucet.

The base assembly 14 is of generally conventional construction and is illustrated in greatest detail in FIG. 3. The assembly includes a threaded inlet shank 18 extending through the sink or counter top S (see FIG. 1) and a shank nut 20 threadedly secured thereon for retaining the inlet shank in position. A flange 22 fits over the upper end of the inlet shank 18 and is secured in position by the inlet nut 24, which is threadedly secured on the inlet shank. The flange and nut together provide an aesthetically trimmed appearance to the installed faucet.

The lower end of the spout 16 extends into and is supported by the inlet shank 18 and is sealed by an O-ring 26 within an annular groove in the spout 16. A split retaining ring 28 fits within an annular groove in the spout 16 and an annular groove defined together by the inlet shank 18 and the inlet nut 24.

The spout 16 (FIGS. 1–2) is also of conventional construction and is a single tubular piece. Generally speaking, the spout includes a vertical portion 30 supported by the base assembly 14, a bend portion 32, and a generally horizontal portion 34. The physical configuration of the spout 16 will vary widely depending primarily on aesthetics.

The poppet valve assembly 10 is the basis of the present invention and is illustrated in greatest detail in FIG. 4. Generally speaking, the valve assembly 10 includes a housing assembly 36, a stem assembly 38, and a valve seal 40.

The housing assembly 36 (FIG. 4) includes a body 42, a retaining cap 44, a seal support 46, and a button cam 48. The body 42 defines a water inlet 50, a water outlet 52, a fluid chamber 54 interconnecting the inlet and outlet. The inlet 50 is fired into the spout 16, and an O-ring 56 seals the inlet 50 within the spout 16. The spout is dimpled at 58 to interlock the two pieces. The inlet includes and defines a valve seat 57. A stream former 60 is press-fitted within the outlet 52 and supports a disk of filtering material 62 and a screen 64. The stream former materials are conventional.

The retaining cap 44 secures the seal support 46 and the button cam 48 within the body 42. The flange 84 of the valve seal 40 is entrapped between the seal support 46 and the button cam 48 (further discussed below) to provide a watertight seal between the valve seal and the valve stem assembly 38.

The valve stem assembly 38 (FIG. 4) includes a valve stem 66, a stem guide 68, and a button 70. The stem 66 is metal and includes a base portion 72, an extended portion 74, an enlarged portion 76, and a barbed tip 77. The base portion 72 and enlarged portion 76 are generally identical in diameter. The extended portion 74 and the barbed tip have a smaller diameter.

The stem guide 68 fits over the base portion 72, and the button 70 snap-fits over the stem guide 68. The face 78 of the button 70 may include the manufacturer's logo, an on/off graphic, or other information. Preferably, the stem guide 68 includes a bayonet mounting (not specifically shown) with the button cam 48 so that partial rotation of the depressed button 70 locks the valve in the "on" position.

The valve seal 40 (FIG. 4) is a boot or sleeve having a tip end 80 and an opposite open end 82. A circumferential flange 84 extends about the entire periphery of the open end 82 and is entrapped between the seal support 46 and the button cam 48. Consequently, water within the chamber 54 is prevented from contacting the valve stem assembly 38 and specifically the valve stem 66. A bellows portion 86 is integrally formed in the valve seal 40 intermediate between the closed and open ends. The end of the base portion 72 of the stem 66 engages the end of the bellows portion 86. The bellows 86 biases the valve into the closed position illustrated in FIG. 4. Consequently, the need for a separate return spring is eliminated.

The tip end 80 of the valve seal is enlarged to provide a valve portion selectively engaging the seat 57. This tip end 80 defines a pocket 88 which receives the enlarged portion 76 of the valve stem 66. The tip end also defines an aperture 89 through which the barbed tip 77 extends. The enlarged portion 76 and the barbed tip 77 provide a snap-fit between the valve stem 66 and the valve seal 40 to interlock the two components. Water pressure within the inlet 34 actually enhances this interlock/seal. Alternatively, the seal could be closed at the tip end so as to completely encapsulate the tip 77. The enlarged portion 76 also provides structural support for the valve portion 80 against the valve seat 57.

Operation

The assembled valve 10 is illustrated in the closed position in FIG. 4. The valve portion 80 of the valve seal 40 engages the valve seat 57 to prevent water flow through the valve. The bellows 86 provide a biasing force to return the valve portion 80 against the valve seat 57. Additionally, water within the inlet 50 aids in maintaining the valve portion 80 against the valve seat 57.

The valve is opened by depressing the button 70, i.e., toward the housing assembly 36 or to the right as illustrated in FIG. 4. The button depression moves the valve guide 68 and valve stem 66 to the fight as illustrated in FIG. 4 pushing the valve portion 80 off the valve seat 57 and permitting water flow therebetween. Water flows through the open valve, through the inlet 50, the chamber 54, the stream former 60 to exit the valve. The entrapment of the flange 84 within the housing assembly 36 provides a leak-tight secondary seal, preventing water from exiting the valve body 10 other than through the outlet 52. The valve seal 40 also prevents water from contacting the metal valve stem 66 within the seal 40, thereby assuring retention of lubrication and minimizing corrosion or liming. While water can contact the barbed tip 77, such contact does not adversely impact lubrication, corrosion, or liming.

The bayonet of the valve stem assembly 38 enables the valve to be locked in the open position with a simple partial mm of the button 70.

The valve is returned to the closed position illustrated in FIG. 4 by releasing the button 70. The biasing force of the bellows portion 86 and the pressure of water within the inlet 50 return the valve portion 80 to the left as illustrated in FIG. 4 to contact the valve seat 57, thereby closing the valve.

The above description is that of a preferred embodiment of the invention. Various alterations and changes can be made without departing from the spirit and broader aspects of the invention, which are to be interpreted in accordance with the principles of patent law including the doctrine of equivalents.

The embodiments of the intentional in which an exclusive property or privilege is claimed are defined as follows:

1. A water faucet comprising:
   base means for supporting said faucet;
   a spout including a lower end supported by said base means and an upper end; and
   a poppet valve assembly supported by said upper end of said spout, said poppet valve assembly including:
   a housing defining a chamber having an inlet in fluid communication with said spout and an outlet in fluid communication with said inlet, said inlet having a chamber side and an inlet side opposite said chamber side, said inlet defining an inlet valve seat external to said chamber and on said inlet side of said inlet;
   a valve stem supported within said housing for reciprocal, linear movement; and
   a valve seal fitted over said valve stem and including a base portion supported by and sealed to said housing on said chamber side of said inlet, said valve seal further including a valve portion extending through said inlet from said chamber side to said inlet side and moving with said stem for selective seating on said inlet valve seat, said valve seal being unapertured between said base portion and said valve portion to prevent water within said chamber from engaging said valve stem within said valve seal, said valve seal further including a bellows portion between said base portion and said valve portion for biasing said valve portion toward said base portion to assist in seating said valve portion on said inlet valve seat.

2. A water faucet as defined in claim 1 wherein said valve stem includes means for operatively interconnecting said valve stem and bellows portion.

3. A water faucet as defined in claim 1 wherein said valve stem includes an enlarged portion adjacent said valve portion, said enlarged portion providing structural support for said valve portion against said valve seat.

4. A water faucet as defined in claim 1 wherein said poppet valve assembly further includes a push button actuator support within said housing and engaging said valve stem, whereby said poppet valve assembly can be operated by actuating said push bottom.

5. A water faucet as defined in claim 1 wherein:
   said poppet valve housing extends into said upper spout end in engagement with said upper end; and
   said upper spout end is dimpled to retain said poppet valve within said spout.

6. A poppet valve assembly comprising:
   a housing assembly defining a chamber including a fluid inlet having a chamber side internal to said chamber and an inlet side esternal to said chamber and a fluid outlet, said fluid inlet defining a valve seat on said inlet side of said fluid inlet;

a valve stem supported within said housing for linear reciprocal movement, said valve stem including an end proximate said valve seat; and a one-piece hollow valve seal over said valve stem, and valve seal including a base attached to said housing on said chamber side of said fluid inlet, said base defining an opening through which said valve extends, said valve seal having a valve end opposite said base, said stem and extending through said fluid inlet from said chamber side to said inlet side and being proximate said valve end of said valve seal, said valve end of said valve seal selectively engaging said valve seat upon selective movement of said valve stem, said valve seal being unapertured between said base and valve end, whereby water within said housing is prevented from engaging said valve stem within said valve seal, said valve seal further including a bellows means for biasing said valve stem in a first direction to assist in engaging said valve end with said valve seat.

7. A poppet valve assembly as defined in claim 6 further comprising means for operatively interconnecting said bellows means and said valve stem.

8. A poppet valve assembly as defined in claim 6 wherein said valve stem includes an enlarged portion in the area of said valve portion to support said valve end against said valve seat.

9. A poppet valves as defined in claim 6 further comprising a push button actuator supported within said housing and engaging said valve stem, whereby the poppet valve can be operated by actuating said push button.

* * * * *

UNITED STATES PATENT AND TRADEMARK OFFICE
CERTIFICATE OF CORRECTION

PATENT NO. : 5,687,952
DATED : November 18, 1997
INVENTOR(S) : Don C. Arnold et al It is certified that error appears in the above-indentified patent and that said Letters Patent is hereby corrected as shown below:

Column 4, Claim 4, Line 56:
   "support" should be --supported--

Column 4, Claim 4, Line 58:
   "bottom" should be --button--

Column 5, Claim 6, Line 1:
   "esternal" should be --external--

Column 5, Claim 6, Line 7:
   "and" should be --said--

Column 5, Claim 6, Line 10:
   After "valve" insert --stem--

Column 5, Claim 6, Line 12:
   Delete "stem and" and insert --valve stem end--

Column 6, Claim 9, Line 12:
   "valves" should be --valve--

Signed and Sealed this

Twenty-fourth Day of February, 1998

*Attest:*

BRUCE LEHMAN

*Attesting Officer*  *Commissioner of Patents and Trademarks*